United States Patent [19]

Levenberg

[11] Patent Number: 4,852,379

[45] Date of Patent: Aug. 1, 1989

[54] METAL FORMING METHODS AND PRODUCTS FORMED THEREBY

[76] Inventor: Nat Levenberg, 2 Windsor Pl., Lynbrook, N.Y. 11563

[21] Appl. No.: 219,232

[22] Filed: Jul. 15, 1988

[51] Int. Cl.⁴ .................................................. B21D 5/01
[52] U.S. Cl. ........................................ 72/384; 72/379; 72/381; 72/404; 72/472; 72/477
[58] Field of Search ................ 72/404, 472, 381, 384, 72/477, 389, 379, 465

[56] References Cited

U.S. PATENT DOCUMENTS

| 2,914,976 | 12/1959 | Demler | 72/404 |
| 3,301,035 | 1/1967 | Gill | 72/404 |
| 3,777,543 | 12/1973 | Kokkola et al. | 72/465 |
| 4,165,629 | 8/1979 | McCabe | 72/382 |
| 4,509,357 | 4/1985 | Zbornik | 72/384 |
| 4,805,438 | 2/1989 | Ginn, Jr. et al. | 72/384 |

FOREIGN PATENT DOCUMENTS

| 0286897 | 6/1931 | Italy | 72/379 |
| 0176422 | 8/1986 | Japan | 72/384 |
| 0028039 | 2/1987 | Japan | 72/404 |

Primary Examiner—David Jones
Attorney, Agent, or Firm—Charles E. Temko

[57] ABSTRACT

The disclosure relates to improved methods of forming sheet metal of general application, and particularly useful in the formation of certain forms of merchandise display devices having relatively moving parts serving to serially advance stacks of merchandise packages.

2 Claims, 2 Drawing Sheets

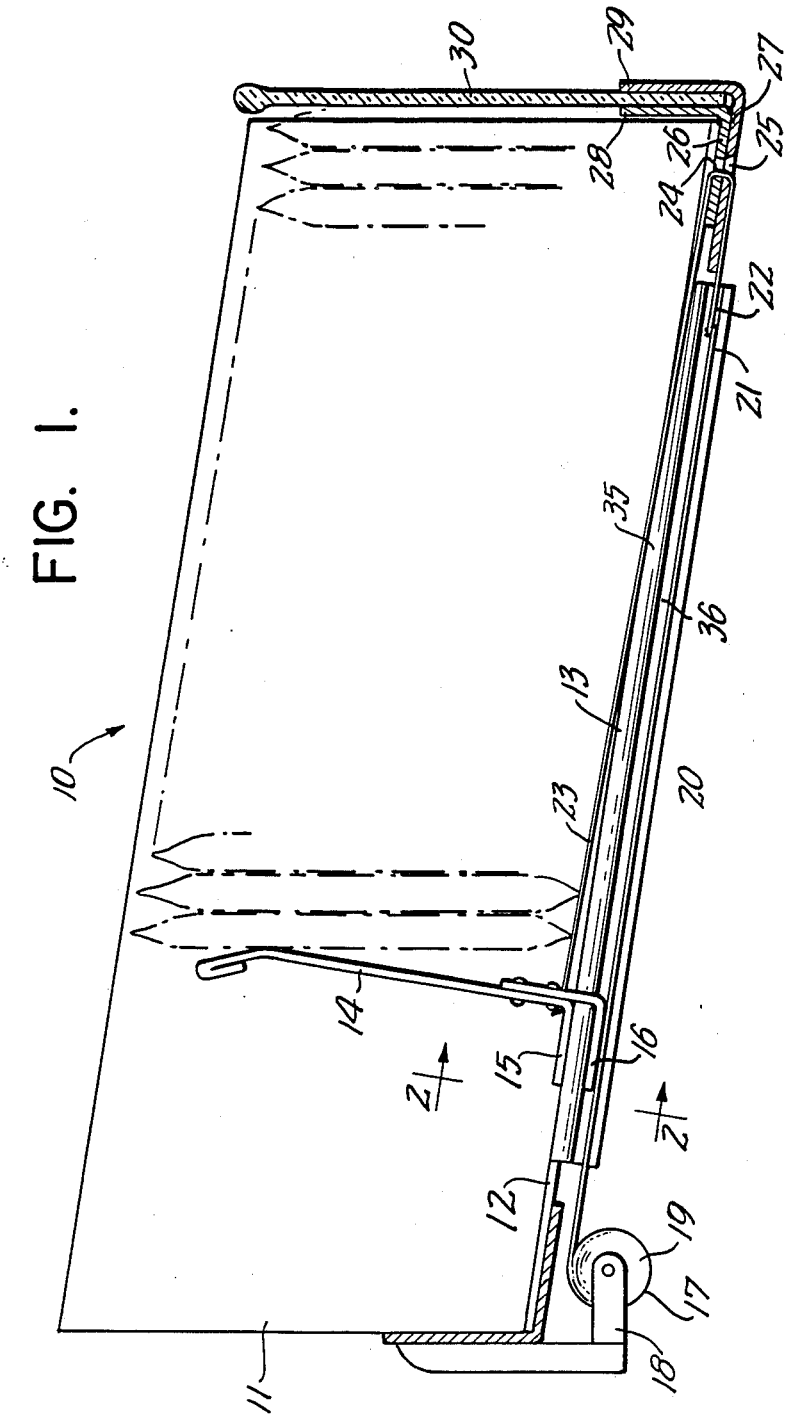
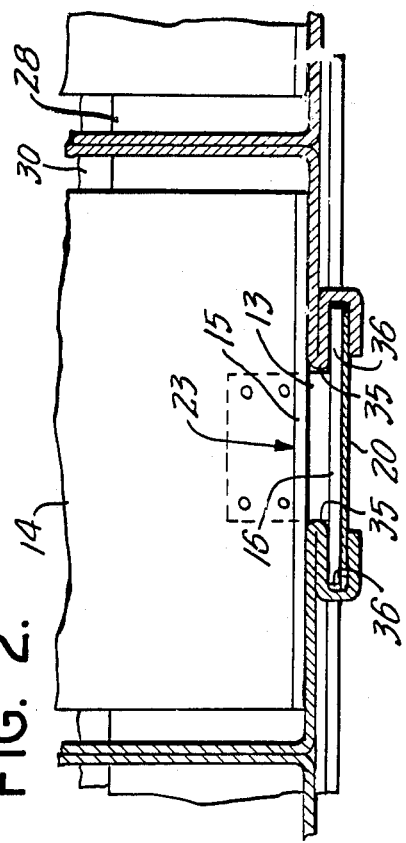

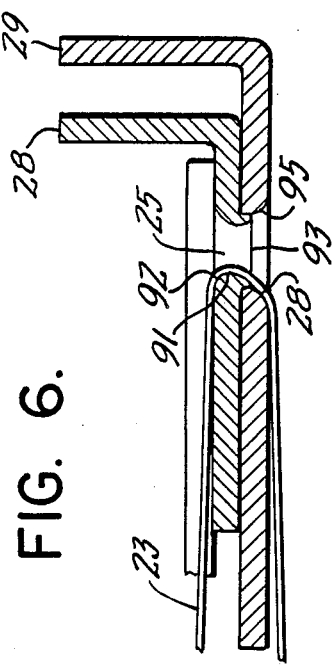
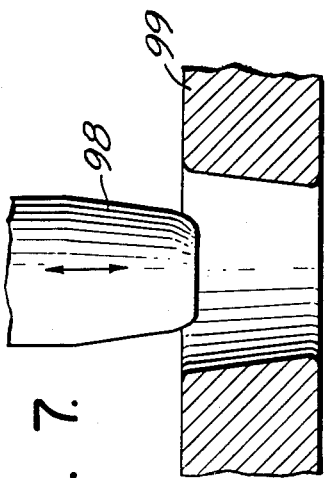
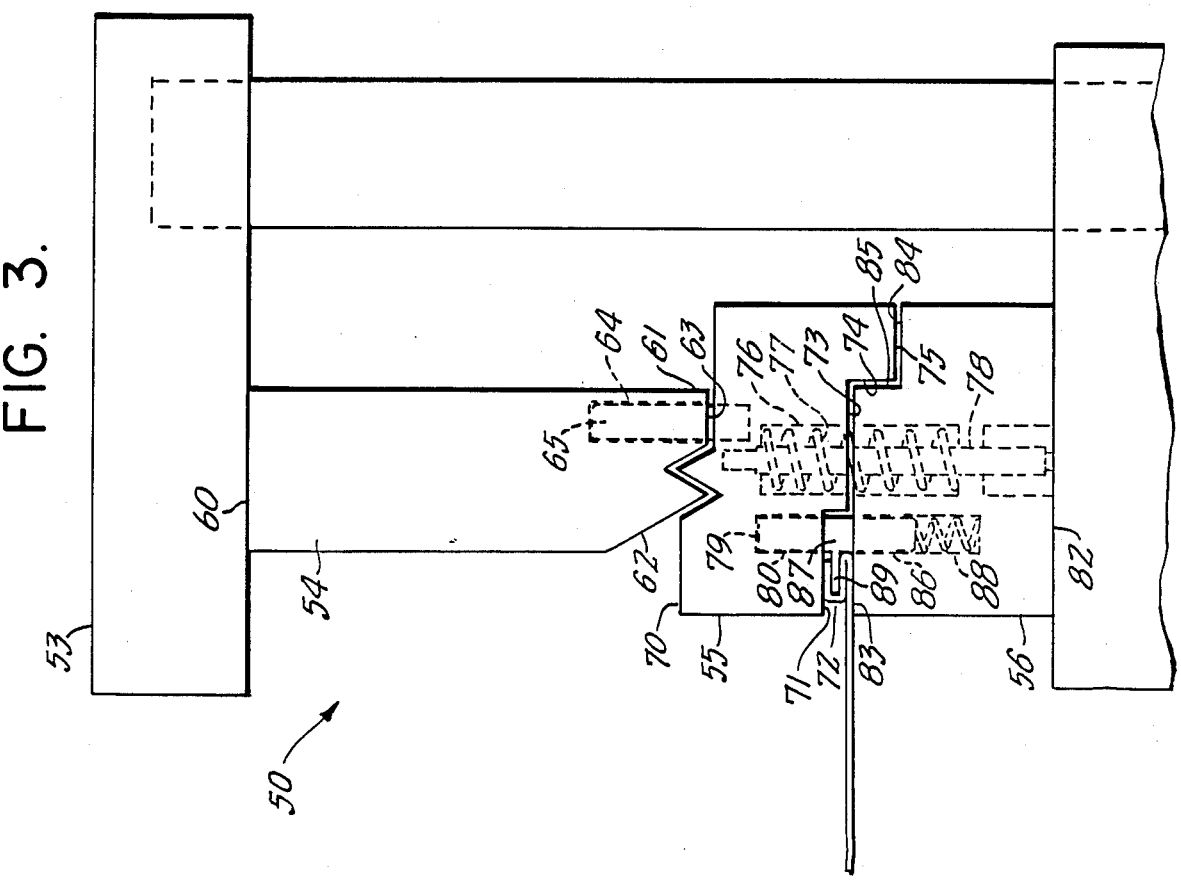

METAL FORMING METHODS AND PRODUCTS FORMED THEREBY

RELATED APPLICATION

Reference is made to my copending application Ser. No. 200,465, filed May 31, 1988, entitled Merchandise Display Device Having Serial Advancement Means.

BACKGROUND OF THE INVENTION

This invention relates generally to the field of sheet metal fabrication, and more particularly to improved methods and techniques for forming the component parts of such products as merchandise display devices having relatively movable component parts, such as those disclosed in the above-mentioned related application.

In that application, there is disclosed a merchandise display device having elongated trays for supporting articles of merchandise packaged in relatively flat rectangular containers, the trays having means for advancement as the lead package in a stack is manually removed. The disclosed device is characterized in the provision of a negator spring, the free end of which is connected to a nylon cord threaded through an opening in a forward end of the tray to be looped back upon itself and secured to a slideably mounted follower on the floor of the tray. In this manner, the advantage of a negator spring, e.g. a constant pulling force is translated to a constant pushing force on the rearwardmost of the stack of packages. The follower employed for this purpose is supported within a slot in the floor of the tray forming a track. The negator spring, in extended condition, moves beneath the slot. A typical device will include any number of such trays.

To avoid axial curling of the negator spring which would render the same inoperative, it is desirable to provide guiding means at periodic intervals along the path of travel. It is also desirable to provide means to prevent the fraying of the nylon cord which interconnects the negator spring to the sliding follower which advances the packages in the tray.

SUMMARY OF THE INVENTION

Briefly stated, the invention contemplates the provision of improved methods of fabrication whereby the above requirements are met without the use of additional metal working steps. To this end, the guide for the negator spring is formed simultaneously as a pair of opposed channels supported beneath the track in the bottom wall of the tray and parallel thereto. In lieu of the usual metal grommets or eyelets, utilization is made of a pair of juxtaposed parallel planar walls which form a recess for a removable front wall of the tray to form a circular channel for the nylon cord which is free of rough edges normally caused by flashing.

BRIEF DESCRIPTION OF THE DRAWING

In the drawing, to which reference will be made in the specification, similar reference characters have been employed to designate corresponding parts throughout the several views:

FIG. 1 is a vertical longitudinal sectional view of a merchandise display device embodying the invention.

FIG. 2 is a transverse sectional view thereof as seen from the plane 2—2 in FIG. 1, and illustrating a negator spring guide element.

FIG. 3 is a schematic side elevational view of a punch and die set and associated slow speed press for creating the negator spring guide element.

FIG. 4 is a side elevational view showing the result of a first operation of the punch and die element of FIG. 3.

FIG. 5 is a side elevational view showing the result of a second operation of the punch and die element.

FIG. 6 is a fragmentary enlarged sectional view corresponding to the right-hand portion of FIG. 1.

FIG. 7 is a schematic sectional view showing a punch and die set for producing the structure shown in FIG. 6.

DETAILED DESCRIPTION OF THE DISCLOSED EMBODIMENT

Referring to FIG. 1 in the drawing, reference character 10 designates a device of the type disclosed in the above-identified copending application, which includes a tray forming element 11 having a bottom wall 12, the wall having a slotted elongated opening 13 accommodating a slideably mounted follower 14 having upper and lower track engaging members 15 and 16, respectively. The follower 14 is urged rightwardly as seen in FIG. 1 by a negator spring element 17 including a supporting bracket 18 rotatably mounting a spring spiral 19 having an extended segment 20, a free end 21 of which engages a free end 22 of a nylon cord 23. The cord 23 forms a loop 24 passing through an opening 25 in a pair of juxtaposed wall portions 26 and 27. This opening is formed by a pair of flanges 28 and 29, as will more fully appear. The flange 29 cooperates with an upturned end of the bottom wall 12 to form a recess which supports a front wall 30.

Referring to FIG. 2, the slotted opening 13 is bounded by a pair of hemmed edges 135 using material which forms a pair of slotted channels 136 immediately therebeneath, the channels 136 forming guides for both the member 16 and the negator spring element 17.

FIG. 6 illustrates the structure of the opening through which the cord 23 passes, the opening being formed in such manner that it is free of flashing, and thus there is no source of undue wear on the cord as it passes through the opening. The present disclosure is particularly directed to the means and manner in which the edges 35 and channels 36 are formed, and the manner in which the opening 25 is formed during the process of sheet metal stamping operations.

Referring to FIG. 3, reference character 50 designates a known die set, including a base 51 supporting vertical and transverse supports 52 and 53 between which are positioned first, second and third die elements 54, 55, and 56, respectively.

The first die element 54 includes an upper end 60 supported from support 53 and a lower end surface 61 defining angularly disposed surfaces 62 and a transverse surface 63. A vertical bore 64 accommodates a first bending gauge 65. The second die element 55 is positioned beneath the first die element 54, and is of generally rectangular configuration. It includes an upper surface 70 adapted to mate with the end 61, a first lower surface 71 forming a gap 72, a second horizontal surface 73, a third vertical surface 74 and a fourth offset surface 75. Extending inwardly from the surface 73 is a recess 74 which accommodates a lifting spring 77 surrounding a stripper bolt 78, both of which are of conventional construction. A controlled height hem gauge 79 is positioned within a recess 80.

The third die element 56 includes a lower support surface 82 and an upper surface 83, a second horizontal surface 84 and a vertical surface 85. Extending downwardly from the surface 83 is a recess 86 which accommodates a resiliently mounted final bend spacer 87 which is normally urged in a vertical direction by a spring 88. The gauge 88 includes a laterally extending flange 89 of thickness approximating one-eight inch.

Referring to FIGS. 4 and 5, the shaping of the desired structure is accomplished in two stages, a first stage of which includes the cooperation of the first and second die elements 54 and 55, and a second of which includes the cooperation of die elements 55 and 56. In the first operation, flat sheet metal forming the bottom wall 12 has been previously punched to form the slotted elongated opening 13. It is then placed between the elements 54 and 55, and the press is lowered to partially bend the edge of the opening 13 to the configuration shown in FIG. 4. Upon opening of the press, the edge of the workpiece is then inserted between elements 55 and 56 as shown in FIG. 3 in such manner that the upper undulation engages the flange 87 of the gauge 86, at which time the press is again lowered to the condition shown in FIG. 3 to result in deforming the edge to the condition shown in FIG. 5 wherein the hem is formed on the edge 35, and the channel 36 is formed immediately therebeneath. For convenience in manufacture, the channel is formed above the hem, although, as part of the finished product, it is disposed therebeneath. This channel accommodates both the negator spring segment 20 and the lower track engaging member 16 which will normally be moving in opposite directions.

Turning now to FIGS. 6 and 7, the opening 25 is formed in two parts. In the bottom wall 12, the opening comprises a laterally extending cylinder 91 having a flared portion 92 merging into the plane of the bottom wall 12, and a second end terminating in a free edge 93 from which the flashing (not shown) has been removed. In the corresponding flange 28 which overlies the opening 25, a hole 95 is punched in an opposite direction, so that whatever flashing is formed is shielded from the nylon cord 23 by the presence of the cylinder 91 which it surrounds. Thus, when the nylon cord is inserted through the opening 25, it contacts only the flared portion 92, the cylinder 91, and the smooth somewhat flared inner surface of the hole 95. FIG. 7 illustrates a male die 98 and a female die 99 which produces the cylinder 91 and flared portion 92, this structure being characterized in that the male die 98 is of diameter somewhat less than the corresponding opening in the female die 99.

It may thus be seen that I have invented novel and and highly useful improvements in metal forming methods and techniques which permit the manufacture of a variety of sheet metal constructions of the type disclosed in my above-mentioned copending application. By use of proper tooling, no additional metal forming steps are necessary to form both smooth openings for the nylon cord and a means for guiding the extended segment of the negator spring element.

I wish it to be understood that I do not consider the invention to be limited to the precise details of structure shown and set forth in this specification, for obvious modifications will occur to those skilled in the art to which the invention pertains.

I claim:

1. An improved sheet metal die construction for forming an integral track and slotted guide adjacent thereto, comprising: first, second and third die elements; said first die element being of elongated configuration and having a first end defining a first wedged-shaped bending surface, and gauge means controlling the depth of penetration of said first bending surface; said second die element having a second end surface corresponding to said first end surface, said first and second end surfaces in engaged condition with a piece of sheet metal stock forming a pair of open undulating portions; said second die element having a third planar end surface opposite said second end surface; said third die element having a fourth planar end surface adapted to be positioned opposite said third end surface and having an axially oriented recess therein and a spacer member positioned within said recess, said member having a laterally extending planar spacer gauge thereon; whereby upon the making of a first bending operation upon stock, said stock is inserted between said first and second die elements to partly form an "S" fold of open configuration, and upon the making of a second bending operation, said partially formed stock is inserted between said second and third die elements with said planar space gauge disposed within one of the previously formed partial folds in said stock prior to the flattening of said stock to form a planar hem and a parallel slotted guide.

2. The method of forming in a single piece of sheet metal stock a planar wall having a finished edge forming a track and a slotted guide disposed immediately beneath said track, said method including the steps of:
  (a) providing a die construction comprising first, second and third die elements; said first die element being of elongated configuration and having a first end defining a first wedge-shaped bending surface, and a gauge means controlling the depth of penetration of said first bending surface; said second die element having a second end surface corresponding to said first end surface, said first and second end surfaces in engaged position with a piece of sheet metal stock forming a pair of open undulating portions, said second die element having a third planar end surface opposite said second end surface; said third die element having a fourth planar end surface adapted to be positioned opposite said third end surface and having an axially oriented recess therein, and a slideably mounted resiliently urged band spacer member having a laterally extending planar space gauge thereon posiitoned within said recess in said member;
  (b) inserting a piece of sheet metal stock between said first and second die elements and making a first bending operation to form an "S" fold of open configuration;
  (c) performing a second bending operation by inserting said previously formed stock between said second and third die elements with said planar space gauge disposed within one of said previously formed folds in said stock prior to the flattening of said stock to form a planar hem and a parallel slotted guide.

* * * * *